United States Patent
Muralidharan et al.

(10) Patent No.: US 11,960,350 B2
(45) Date of Patent: Apr. 16, 2024

(54) SYSTEM AND METHOD FOR ERROR REPORTING AND HANDLING

(71) Applicant: SAMSUNG ELECTRONICS CO., LTD., Suwon-si (KR)

(72) Inventors: Kiran Kumar Muralidharan, Bengaluru (IN); Srinivasa Raju Nadakuditi, Bengaluru (IN); Vulligadla Amaresh, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/817,476

(22) Filed: Aug. 4, 2022

(65) Prior Publication Data
US 2023/0053582 A1 Feb. 23, 2023

(30) Foreign Application Priority Data
Aug. 4, 2021 (IN) .............................. 202141035134

(51) Int. Cl.
G06F 11/07 (2006.01)
(52) U.S. Cl.
CPC ...... *G06F 11/0772* (2013.01); *G06F 11/0706* (2013.01); *G06F 11/0781* (2013.01); *G06F 11/0793* (2013.01)
(58) Field of Classification Search
CPC ............. G06F 11/0706; G06F 11/0772; G06F 11/0781; G06F 11/0793
See application file for complete search history.

(56) References Cited

U.S. PATENT DOCUMENTS

| 7,594,144 B2 | 9/2009 | Brandyberry et al. |
| 9,442,793 B2 * | 9/2016 | Shacham ............ G06F 11/0772 |
| 10,678,623 B2 | 6/2020 | Derr et al. |
| 11,036,543 B1 * | 6/2021 | Swanson ............... G06F 13/102 |
| 2019/0034264 A1 | 1/2019 | Radhakrishnan et al. |
| 2019/0052277 A1 * | 2/2019 | Rapeta ................ G06F 11/0703 |

OTHER PUBLICATIONS

QDMA Subsystem for PCI Express v3.0 (PG302 (v3.0) Nov. 22, 2019).
NVM Express Revision 1.4 Jun. 10, 2019.

* cited by examiner

*Primary Examiner* — Joseph R Kudirka

(74) *Attorney, Agent, or Firm* — F. Chau & Associates, LLC

(57) ABSTRACT

A system for error reporting and handling includes a memory storing an error handler, a processor configured to execute the error handler, and a buffer. The error handler is configured to receive an error message from a system on chip (SOC) platform. The error message indicates a plurality of errors have occurred in the SOC platform, and the buffer stores the error message. Further, the error handler is configured to report the error message using a single interrupt. Further, the error handler is configured to handle the errors in the error message using the single interrupt.

20 Claims, 5 Drawing Sheets

SYSTEM AND METHOD FOR ERROR REPORTING AND HANDLING

CROSS REFERENCE TO RELATED APPLICATION

This U.S. non-provisional patent application claims priority under 35 U.S.C. § 119 to Indian Provisional Application No. 202141035134 filed on Aug. 4, 2021 in the Indian Patent Office, the disclosure of which is incorporated by reference in its entirety herein.

TECHNICAL FIELD

Embodiments disclosed herein relate to error handling methods and systems, and more particularly to methods and systems for error reporting and handling.

DISCUSSION OF RELATED ART

A System on Chip (SOC) is an integrated circuit that integrates all or most components of a computer or other electronic system. These components typically include a central processing unit (CPU), memory devices, memory interfaces, on-chip input/output (I/O)_devices and I/0 interfaces.

A fatal error may occur in a system including the SOC due to various reasons such as a design bug, timing issues, and memory errors. When the fatal error occurs, the system is brought down immediately. A reliable detection of the fatal error is very important in a memory device (e.g., solid state drives (SSD) or the like) deployed in the system that demand very high reliability. In a complex SOC, there can be 100s of such errors that need to be detected and reported. One method of detecting a fatal error use an interrupt and associated context that specifies more details about the error. However, maintaining one interrupt bit for each error and dedicating additional status registers for each error is a daunting task both for a firmware unit and hardware architects. It increases the logic, complexity of design and firmware code to manage an Interrupt Service Routine (ISR) to decode each error.

FIG. 1 shows an existing scheme for handling a fatal error. In the existing scheme, one interrupt bit is dedicated for each error and error context is maintained for each error. However, this scheme requires hundreds of interrupt bits and thousands of error context registers. Thus, the firmware unit would become extremely complex to handle so many interrupts.

SUMMARY

An example embodiment of the disclosure provides a system for error reporting and handling. The system includes a memory storing an error handler, a processor configured to execute the error handler and a buffer. The error handler is configured for receiving an error message from a system on chip (SOC) platform. The error message indicates a plurality of errors have occurred in the SOC platform, and the buffer stores the error message. The error handler is configured to report the error message using a single interrupt. Further, the error handler is configured to handle the errors in the error message using the single interrupt.

An example embodiment of the disclosure provides a method for error reporting and handling. The method includes receiving, by a system, an error message from a SOC platform, where the error message indicates that a plurality of errors have occurred in the SOC platform, and the system includes a buffer for storing the error message. The method further includes reporting, by the system, the error message using a single interrupt, and handling, by the system, the plurality of errors in the error message using the single interrupt.

In an embodiment, the handling includes detecting that the errors have occurred in the SoC platform, raising an interrupt corresponding to the errors, processing the error message based on the interrupt using a firmware unit, performing at least one action based on the processed error message, clearing the interrupt, and performing at least one of i) sending an acknowledgment message for the processed error message and ii) waiting for another interrupt to process.

In an embodiment, processing the error message using the firmware unit includes determining the error message includes two errors, determining a priority among the two errors, and processing one of the two errors based on the priority.

In an embodiment, the error handler processes each of the two errors one at a time sequentially.

In an embodiment, the system includes at least one design block to hold a design state of the error handler until all the errors are processed by the firmware unit.

In an embodiment, the error message includes at least one of a design block identifier (ID), an opcode for each of the errors, and context information for each of the errors.

In an embodiment, one of the errors is a fatal error, wherein the fatal error comprises at least one of a static random-access memory (SRAM) read error, a SRAM write error, an Advanced eXtensible Interface (AXI) Bus access error, an AXI Bus Parity Error, a counter underflow error, a counter overflow error, a First-in, first-out (FIFO) overflow, a FIFO underflow, a packet field corruption error, accessing un-initialized location, and an unsupported configuration.

According to an example embodiment of the disclosure, a system for error handling includes a memory storing an error handler, a processor configured to execute the error handler, and a buffer. The error handler is configured to receive a plurality of error requests from each of a plurality of hardware blocks of a system on chip, wherein each error request indicates an error has occurred in SoC due to the corresponding hardware block, and the buffer stores an error message including information about the errors. The error handler handles the errors of the error message using a single interrupt.

In an embodiment, each error request includes an identifier that identifies the corresponding hardware block and an opcode identifying a type of the corresponding error. In an embodiment, the error handler sends an acknowledgement message to one of the hardware blocks after processing the error request associated with the one hardware block. The acknowledgement message may include the identifier and the opcode. In an embodiment, each error request further includes context information explaining the corresponding error.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
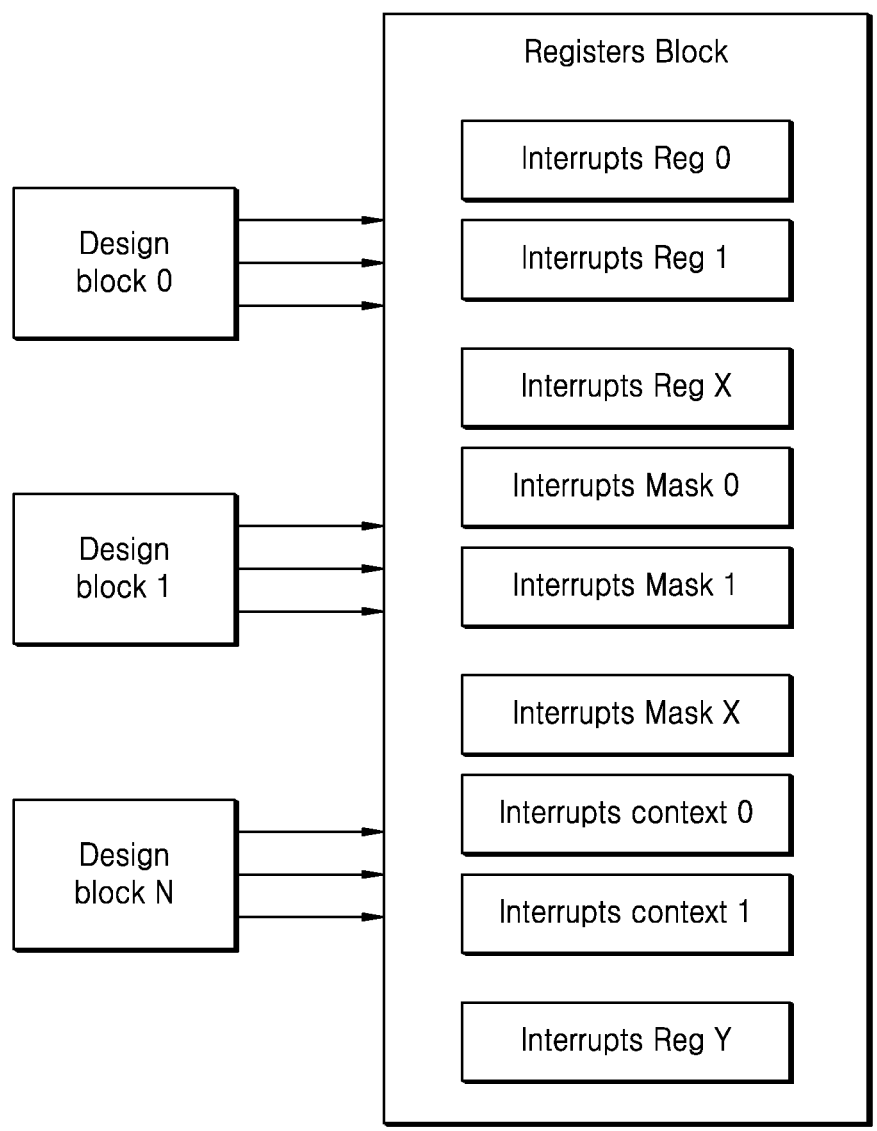
FIG. 1 shows an existing scheme for handling fatal errors.

At least one embodiment of the disclosure provides methods and systems for error reporting and handling.

At least one embodiment of the disclosure is capable of reporting all fatal error events in an SOC system or platform using a single interrupt and a single window to report a context of the error. For example, all the fatal error events that occur during a first time period can be reported together during a second time period that occurs after the first time period using a single interrupt. Such may save many interrupt bits (e.g., up to 800 interrupt bits) and several special function registers (SFRs) storing error context information (e.g., 2000 or more SFRs).

The embodiments herein and the various features and details thereof are explained more fully with reference to non-limiting embodiments that are illustrated in the accompanying drawings and detailed in the following description. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

At least one of the embodiments described herein achieve a system for error reporting and handling. The system may include an error handler, a processor, a memory and a buffer. The error handler is configured for receiving an error message from an SOC or a system including the SOC (e.g., an SOC platform). The error message indicates that one or more errors have occurred in the SOC platform, and the buffer stores the error message. Further, the error handler is configured for reporting the error message using a single interrupt and a single window to report a context of the error message. Further, the error handler is configured for handling multiple errors in the error message using the single interrupt.

The proposed method may report all FATAL error events in a SOC platform together using the single interrupt to report a context of the errors, so as to save more interrupt bits (for example, up to 800 interrupt bits) and more function registers (for example, 2000 or more special function registers) storing error context. The context of the errors may provide information on each of the errors.

Based on the proposed method, special function registers (SFR) space to store the additional context, related to the errors are saved. The error handler gets all the necessary context related to the error message all in one place. Further, the number of interrupts bits may be significantly reduced. A firmware unit in an embodiment has only one interrupt to handle. Since the number of unique errors is few, the message format can be kept standard for similar errors making the error parsing simpler.

The method can enable design blocks to hold a design state until an error is processed by a firmware unit (e.g., firmware). By holding the design state, the proposed method refers to holding the state of a finite state machines (FSMs) and interfaces in the same state till the error is processed by the firmware unit. This makes sure that the firmware unit can take an accurate snapshot of the design and Static random-access memory (SRAM) contents before it changes. The hold occurs till the specific error reported by the 'design block' is processed. In the proposed method, one of the design blocks holds a design state and error reporting until a previous design block has completed its reporting. The terms "design block" and "hardware block" are used interchangeably in the patent disclosure. The design block refers to hard circuits (e.g., interrupt controller, scheduler, arbiter or the like) that perform a specific function in a system. The method can be used to impose priority across various errors. The method can be used to impose a common structure for similar error messages, in spite of varying field sizes. The method can be used to sequence multiple fatal errors and report them one at a time. The method can be used for error reporting and handling with less logic complexity and time. The method can be used for reducing logic gates in a non-volatile memory express (NVMe) controller.

Figure 2:
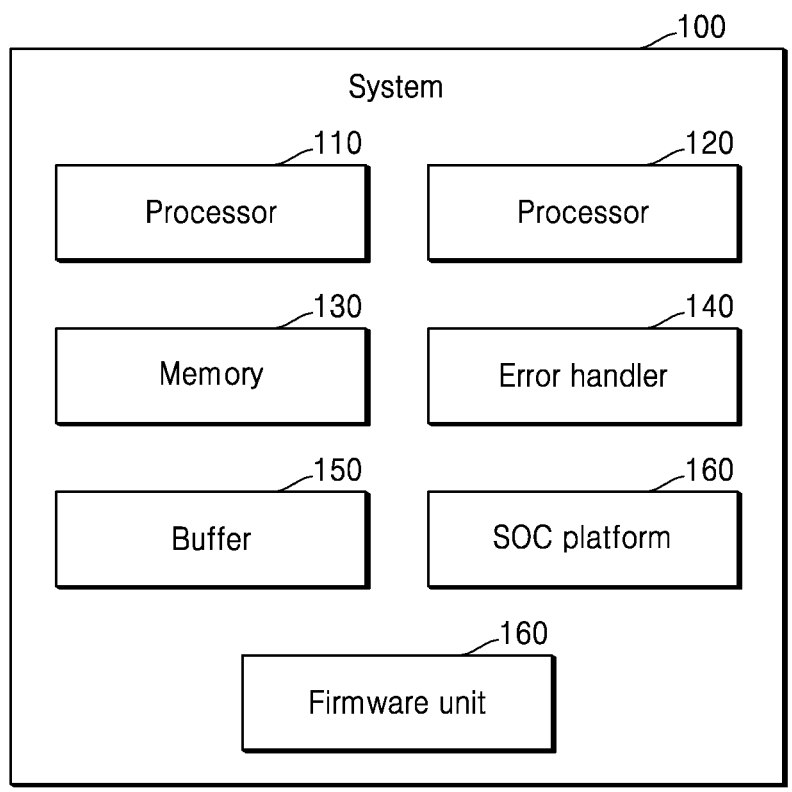
FIG. 2 shows various hardware components of a system for error reporting and handling, according to an example embodiment of the disclosure.

FIG. 2 illustrates a system (100), according to an example embodiment of the disclosure. The system (100) can be, for example, but is not limited to a data centre, a server, a laptop, a desktop computer, a notebook, a Device-to-Device (D2D) device, a vehicle to everything (V2X) device, a smartphone, a foldable phone, a smart TV, a tablet, an immersive device, and an internet of things (IoT) device.

The system (100) includes a processor (110), a communicator (120), a memory (130), an error handler (140), a buffer (150), a SOC platform (160) and a firmware unit (170). The processor (110) is coupled with the communicator (120), the memory (130), the error handler (140), the buffer (150), the SOC platform (160) and the firmware unit (170). The communicator 120 may be a transceiver or a modem to enable communication across a computer network.

The systems and methods described herein refer to an error handling and reporting infrastructure. The error handling and reporting infrastructure may be used to detect errors across an entire SoC platform (160), across multiple SoCs platform (160) that are part of an electronic device/system (100) or at any level of granularity in the SoCs platform (160).

The error handler (140) may interface with two or more hardware blocks to capture errors or other status messages from the hardware blocks and act on them as appropriate. The hardware blocks may be the design blocks. The error handler (140) may execute diagnostic routines that perform various functions, such as resetting a hardware block, reconfiguring a hardware block, or disabling a hardware block, for example. The error handler (140) may be implemented by a logic circuit or be a computer program stored on the memory 130 for execution by the processor 110. Logging and other reporting features may be used in certain cases to alert users, system administrators, or other hardware blocks of failure or malfunction.

The error handler (140) receives an error message from the SOC platform (160). The error message indicates that one or more errors have occurred in the SOC platform (160), and the buffer (150) stores the error message. The errors may include one or more fatal errors, where the fatal error can be, for example, but is not limited to a SRAM read error, a SRAM write error, an AXI Bus access error, an AXI Bus Parity Error, a counter underflow error, a counter overflow error, a FIFO overflow, a FIFO underflow, a packet field corruption error, accessing un-initialized location, and an unsupported configuration. An example of context (e.g., context information) for an SRAM RD/WR error can be an SRAM address, SRAM data and an ECC signature.

In an example embodiment, the error message includes a design block identifier (ID), an opcode for at least one error, a context of the at least one error and details about the at least one error. Below is the format of the error message as shown in Table 1, for example:

TABLE 1

| Error Message Format - N 128-bit Message | | | | |
|---|---|---|---|---|
| BlockID | ErrorOp | Additional Info | Next | Context |
| Design Block ID | Opcode for the specific Error | ... | 0 - Last Message 1 - Another 128 is present | 128 bit Minus Fixed Header to give the associated Context for the Error. Extended Context can be achieved using Next Bit |

For example, the error message (ERRMSG) may identify which of the design blocks caused one or more errors with the design block ID, the types of these errors with opcodes, and context information explaining each of the errors.

Below is the format of an error message acknowledgement as shown in Table 2, for example:

TABLE 2

| BlockID | ErrorOp | RSVD |
|---|---|---|
| Design Block ID | Opcode for the specific Error | |

A design block may send an error message to the error handler 140 and the error handler 140 may respond to the design block with the error message acknowledge (ERRMSGACK) acknowledging that it has received the error message.

The message format can be kept common for each unique error. An embedded field in the error message will indicate the unique error type. This saves a lot of parser code for each error. Table 3 indicates a structure for the SRAM error, for example.

TABLE 3

| Structure for SRAM Error | | | | | | |
|---|---|---|---|---|---|---|
| Structure Type Opcode | Addr Len (A Bits) | Data Len (D bits) | ECC Len (E bits) | Addr | Data | ECC |
| SRAM Error | x | y | z | X-bits | Y-bits | Z-bits |
| | Fixed Length | | | Variable Length | | |

Table 4 indicates a structure for the AXI error.

TABLE 4

| Structure for AXI Error | | | | | | |
|---|---|---|---|---|---|---|
| Structure Type Opcode | Addr Len (A Bits) | Data Len (D bits) | User field len (U bits) | Addr | Data | User |
| AXI Error | x | y | z | X-bits | Y-bits | Z-bits |
| | Fixed Length | | | Variable Length | | |

Further, the error handler (140) generates and reports the error message using a single interrupt Error_Intr and a single window to report a context of the error message. Further, the error handler (140) handles multiple errors in the error message using the single interrupt and the single window. The single window reports the context of the error message. For example, instead of raising a single interrupt for each error in the error message, the error handler (140) raises a single interrupt for all the errors in the error message.

In an embodiment, the error handler (140) detects that one or more errors have occurred in the SoC platform (160). Further, the error handler (140) raises an interrupt corresponding to the errors and processes the error message based on the interrupt using the firmware unit (170). In an embodiment, the error message is processed by determining the error message includes at least two errors, determining a priority among the at least two errors, and processing the error message based on the priority. In an example, when the SRAM error and a Counter Overflow error occurs together, the proposed method would give priority to handle the Counter Overflow error first because that points to a design issue and SRAM error is only a process related error. Another example is to give priority to handling error from a critical design block. For example, a critical design block is expected to have high reliability with higher priority.

Further, the error handler (140) performs an action based on the processed error message. The action can be, for example, but is not limited to a taking a snapshot of the state of the electronic device, resetting the electronic device or the like. Further, the error handler (140) clears the processed interrupt corresponding to an error message including one or more errors. Further, the error handler (140) sends an acknowledgment message for the processed error message. For example, the error handler (140) may send an acknowledgment message to the design block from which it received an error message. Alternately, the error handler (140) waits for another interrupt to process. Further, the error handler (140) processes the single error among the at least two errors at an instance. For example, the error handler (140) may process each of the at least two error one at a time sequentially.

In an embodiment, the system (100) includes at least one design block to hold a design state of the error handler (140) until the error is processed by the firmware unit (170). Instead of reporting by one interrupt per error, the error is reported using the message that will be stored in the buffer (150) when an error occurs. Only one buffer (150) is provided for all errors. The message structure will convey all the necessary information about the error. When an error occurs, the corresponding error message is stored in the buffer (150) and an interrupt is raised after multiple errors have occurred. The firmware unit (170) processes the error message and takes action.

The error handler (140) may be physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although FIG. 2 shows various hardware components of the system (100) it is to be understood that other embodiments are not limited thereto. In other embodiments, the system (100) may include less or more components than illustrated in FIG. 2. Further, the labels or names of the components are used only for illustrative purpose and does not limit the scope of the invention. One or more components can be combined together to perform a same or substantially similar function in the system (100).

Figure 3:
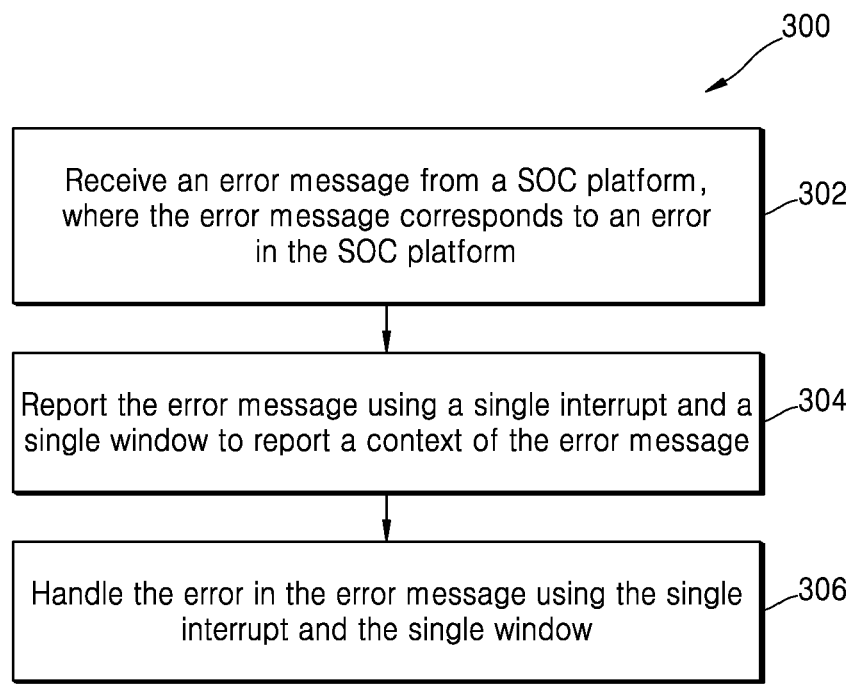
FIG. 3 is a flow chart illustrating a method for error reporting and handling, according to an example embodiment of the disclosure.

FIG. 3 is a flow chart (300) illustrating a method for error reporting and handling, according to an example embodiment of the disclosure. At step 302, the method includes receiving the error message from the SOC platform (160). For example, the error handler 140 may receive an error message from one of the design blocks of the SOC platform (160). The error message may include information on multiple errors. At step 304, the method includes reporting the error message using a single interrupt and the single window to report a context of the error message. At step 306, the method includes handling the error in the error message using the single interrupt and the single window.

The proposed method may report all FATAL error events in the SOC platform (160) using a single interrupt and a single window to report a context of multiple errors, so as to save more interrupt bits (for example, up to 800 interrupt bits) and more special function registers (for example, 2000 or more special function registers) storing error context.

Based on the proposed method, special function registers (SFR) space to store the additional context, related to multiple errors is saved. The error handler (140) gets all the necessary context related to the error message all in one place. The number of interrupts bits may be significantly reduced. The firmware unit (170) has only one interrupt to handle. Since the number of unique errors is few, the message format can be kept standard for similar errors making the error parsing simpler.

The method enables each of the design blocks to hold a design state, until the error is processed by the firmware unit (170). In the proposed method, one of the design blocks holds the design state and error reporting until a previous design block has completed its reporting. The method can be used to impose priority across various errors. The method can be used to impose a common structure for similar error messages, in spite of varying field sizes. The method can be used to sequence multiple fatal errors and report them one at a time. The method can be used for error reporting and handling with low logic complexity and less time. The method can be used for reducing logic gates in a NVMe controller (not shown).

Figure 4:
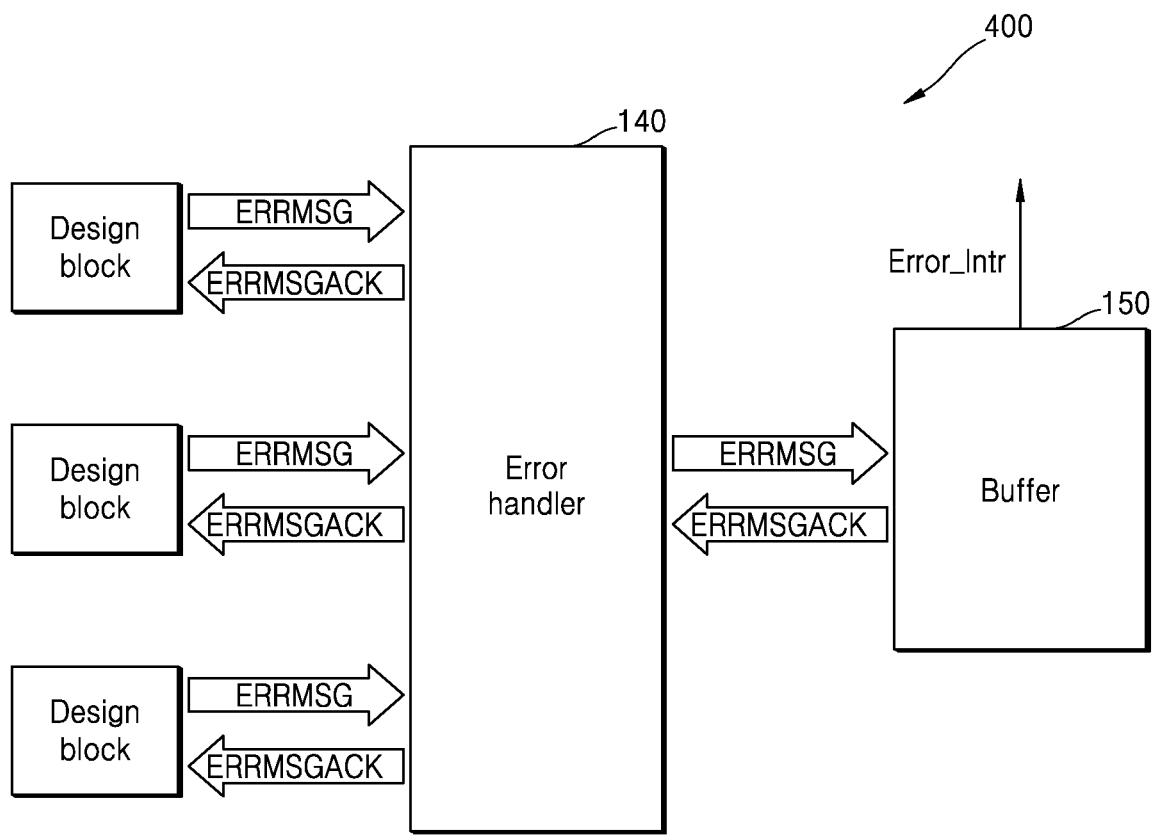
FIG. 4 shows a scheme for handling fatal errors, according to an example embodiment of the disclosure.
Figure 5:
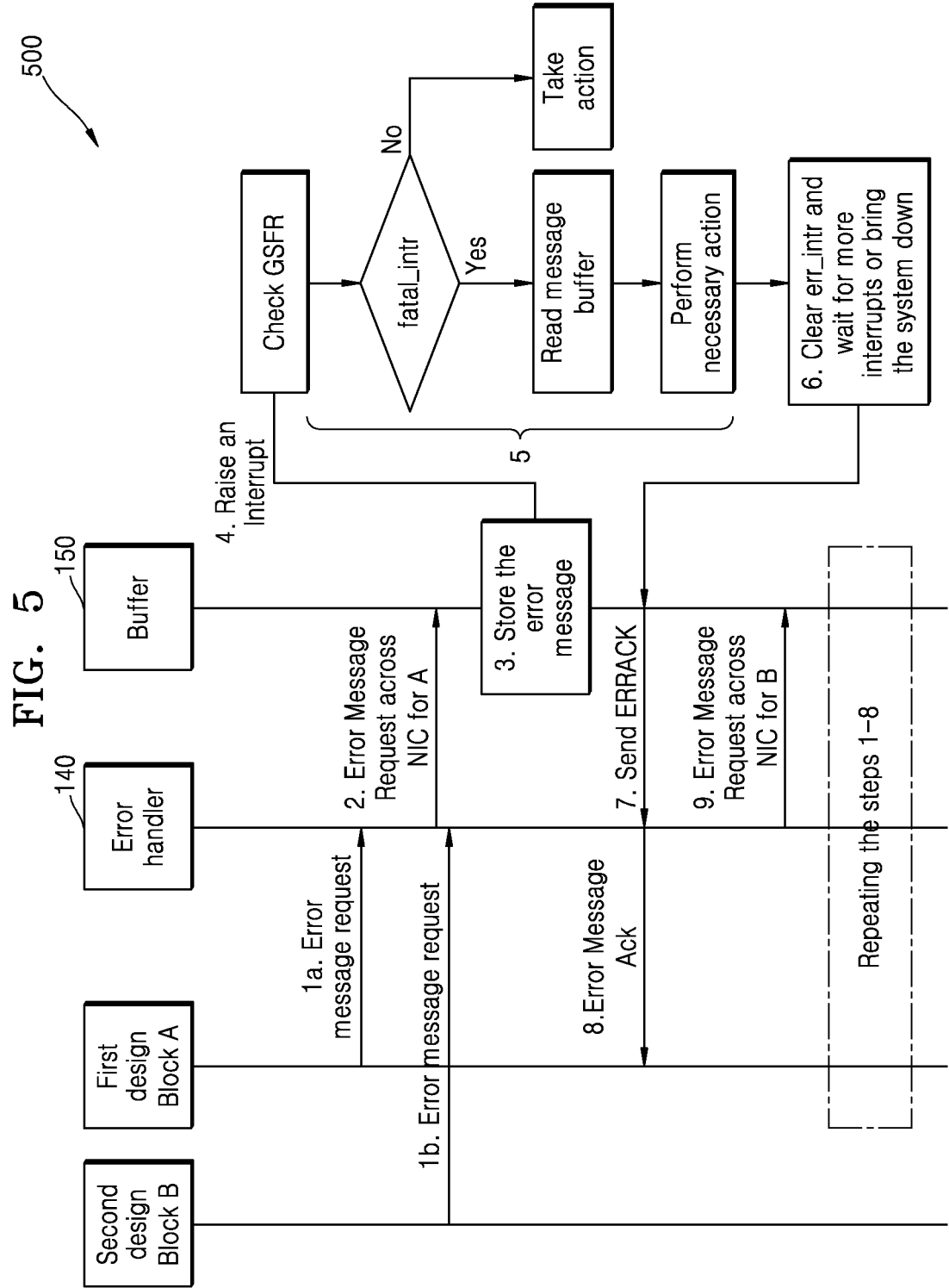
FIG. 5 shows sequence diagram illustrating handling fatal errors, according to an example embodiment of the disclosure.

FIG. 4 shows a proposed scheme (400) for handling fatal errors, according to an example embodiment of the disclosure. Referring FIG. 4, instead of reporting by 1 interrupt per error, multiple errors are reported using the error message that is stored in the buffer (150). Only one buffer (150) is provided for all errors. The message structure will convey all the necessary information about the error. When multiple errors occur, an error message is stored in the buffer (150) and an interrupt is raised. In other words, the buffer (150) stores only one error message at a time. In the flowchart (as shown in FIG. 5) it is shown that only one error message is accepted and stored in the buffer (150) at a time. Only after this error message is processed by the firmware unit (170), next error message is accepted for processing. The firmware unit (170) processes the error message and takes action.

The various actions, acts, blocks, steps, or the like in the flow chart (300) may be performed in the order presented, in a different order or simultaneously. Further, in some embodiments, some of the actions, acts, blocks, steps, or the like may be omitted, added, modified, skipped, or the like without departing from the scope of the invention.

FIG. 5 shows a sequence diagram (500) illustrating handling fatal errors, according to an example embodiment of the disclosure. Referring to FIG. 5, at 1a, a first design block sends a first error message request to the error handler (140). The first error message request may indicate that the first design block has caused one or more first errors in the SOC platform (160) and identify the types of the one or more first errors. At 1b, a second design block sends a second error message request to the error handler (140). The second error message request include a first error message indicating that the second design block has caused one or more second errors in the SOC platform (160) and identify the types of the one or more second errors. The error handler (140) receives the first error message request and the second error message request from the first design block and the second design block, respectively. At 2, the error handler (140) sends the first error message request received from the first design block to the buffer (150). For example, the error handler (140) may send the first error message request using a network interface card (NIC) to the buffer (150). At 3, the buffer (150) stores a first error message in response to receiving the first error message request. At 4, the error handler (140) raises an interrupt. At 5, the firmware unit (170) checks a Global Special Function Register (GSFR) to determine whether a fatal error has occurred. If a fatal error has not occurred, the firmware unit (170) performs an action. If the fatal error has occurred, the firmware unit (170) performs the action by reading the error message from the buffer (150). At 6, the firmware unit (170) clears an error interrupt and waits for more interrupts or brings the system down. At 7, the buffer (150) sends an error acknowledgement (ERRACK) to the error handler (140). At 8, the error handler (140) sends an error message acknowledgement to the first design block. After clearing the first error message request, at 9, the error handler (140) sends the second error message request received from the second design block to the buffer (150).

The embodiments disclosed herein can be implemented through at least one software program running on at least one hardware device and performing network management functions to control the elements. The elements can be at least one of a hardware device, or a combination of hardware device and software module.

While the inventive concept has been particularly shown and described with reference to embodiments thereof, it will be understood that various changes in form and details may be made therein without departing from the spirit and scope of the following claims.

What is claimed is:

1. A system for error reporting and handling, comprising:
   a memory storing an error handler;
   a processor configured to execute the error handler; and
   a buffer,
   wherein the error handler is configured to:
   receive an error message from a system on chip (SoC) platform, wherein the error message indicates a plurality of errors have occurred in the SoC platform, and the buffer stores the error message;
   report the error message using a single interrupt; and
   handle the plurality of errors in the error message using the single interrupt.

2. The system of claim 1, wherein the handle of the plurality of errors comprises:
   detecting that the plurality of errors have occurred in the SoC platform;
   raising an interrupt corresponding to the plurality of errors;
   processing the error message based on the interrupt using a firmware unit;
   performing at least one action based on the processed error message;
   clearing the interrupt; and
   performing at least one of i) sending an acknowledgment message for the processed error message and ii) waiting for another interrupt to process.

3. The system of claim 2, wherein processing the error message using the firmware unit comprises:
   determining the error message comprises two errors;
   determining a priority among the two errors; and
   processing the error message based on the priority.

4. The system of claim 3, wherein the error handler processes each of the two errors one at a time sequentially.

5. The system of claim 2, wherein the system comprises at least one design block to hold a design state of the error handler until all of the plurality of errors are processed by the firmware unit.

6. The system of claim 1, wherein the error message comprises at least one of a design block identifier (ID), an opcode for each of the errors, and context information for each of the plurality of errors.

7. The system of claim 1, wherein one of the plurality of errors is a fatal error, wherein the fatal error comprises at least one of a static random-access memory (SRAM) read error, a SRAM write error, an Advanced eXtensible Interface (AXI) Bus access error, an AXI Bus Parity Error, a counter underflow error, a counter overflow error, a First-in, first-out (FIFO) overflow, a FIFO underflow, a packet field corruption error, accessing an un-initialized location, and an unsupported configuration.

8. A method for error reporting and handling, comprises:
   receiving, by a system, an error message from a system on chip (SoC) platform, wherein the error message indicates that a plurality of errors have occurred in the SoC platform, and the system includes a buffer for storing the error message;
   reporting, by the system, the error message using a single interrupt; and
   handling, by the system, the plurality of errors in the error message using the single interrupt.

9. The method of claim 8, wherein the handling comprises:
   detecting that the plurality of errors have occurred in the SoC platform; raising an interrupt corresponding to the plurality of errors;
   processing the error message based on the interrupt using a firmware unit;
   performing at least one action based on the processed error message;
   clearing the interrupt; and
   performing at least one of i) sending an acknowledgment message for the processed error message and ii) waiting for another interrupt to process.

10. The method of claim 9, wherein processing the error message using the firmware unit comprises:
    determining the error message comprises two errors;
    determining a priority among the two errors; and
    processing one of the two error errors based on the priority.

11. The method of claim 10, wherein an error handler processes each of the two errors one at a time sequentially.

12. The method of claim 9, wherein the system comprises at least one design block to hold a design state of an error handler until all of the plurality of errors are processed by the firmware unit.

13. The method of claim 8, wherein the error message comprises at least one of a design block identifier (ID), an opcode for each of the plurality of errors, and context information for each of the plurality of errors.

14. The method of claim 8, wherein one of the plurality of errors is a fatal error, wherein the fatal error comprises at least one of a static random-access memory (SRAM) read error, a SRAM write error, an Advanced eXtensible Interface (AXI) Bus access error, an AXI Bus Parity Error, a counter underflow error, a counter overflow error, a First-in, first-out (FIFO) overflow, a FIFO underflow, a packet field corruption error, accessing an un-initialized location, and an unsupported configuration.

15. A system for error handling, comprising:
    a memory storing an error handler;
    a processor configured to execute the error handler; and
    a buffer,
    wherein the error handler is configured to:
    receive a plurality of error requests from each of a plurality of hardware blocks of a system on chip (SoC), wherein each error request indicates an error among a plurality of errors has occurred in the SoC due to a corresponding hardware block of the plurality of hardware blocks, and the buffer stores an error message including information about the plurality of errors; and
    handle the plurality of errors of the error message using a single interrupt.

16. The system of claim 15, wherein each error request of the plurality of error requests includes an identifier that identifies the corresponding hardware block and an opcode identifying a type of a corresponding error.

17. The system of claim 16, wherein the error handler sends an acknowledgement message to one of the plurality of hardware blocks after processing the error request associated with the one hardware block.

18. The system of claim 17, wherein the acknowledgement message includes the identifier and the opcode.

19. The system of claim 17, wherein each error request further includes context information explaining a corresponding error.

20. The system of claim 15, wherein each of the plurality of errors is one of a static random-access memory (SRAM) read error, a SRAM write error, an Advanced eXtensible Interface (AXI) Bus access error, an AXI Bus Parity Error, a counter underflow error, a counter overflow error, a First-in, first-out (FIFO) overflow, a FIFO underflow, a packet field corruption error, accessing an un-initialized location, and an unsupported configuration.

* * * * *